United States Patent [19]

Lee

[11] 4,044,633
[45] Aug. 30, 1977

[54] DIFFERENTIAL DRIVES INCLUDING FLEXIBLE INTERCONNECTING DRIVE ELEMENTS

[76] Inventor: Robert W. Lee, 5 Rockwood St., Walpole, Mass. 02081

[21] Appl. No.: 661,393

[22] Filed: Feb. 25, 1976

[51] Int. Cl.² .......................... F16H 3/44; F16H 1/28; F16H 9/00
[52] U.S. Cl. ................................ 74/750 R; 74/217 C; 74/626; 74/802
[58] Field of Search ..................... 74/802, 750 R, 626, 74/217 C

[56] References Cited

U.S. PATENT DOCUMENTS

| 3,842,685 | 10/1974 | Philpott et al. | 74/750 R X |
| 3,979,971 | 9/1976 | Generke et al. | 74/802 X |

Primary Examiner—Leonard H. Gerin
Attorney, Agent, or Firm—Maurice R. Boiteau

[57] ABSTRACT

There are disclosed in the present specification a plurality of planetary differential drive formats, both simple and compound, in which each drive pair or couple comprises a driving and a driven element interconnected by a flexible connector such as a roller chain or a cogged belt and at least one driving and one driven element are mounted for planetary motion about the input and output axis.

10 Claims, 5 Drawing Figures

DIFFERENTIAL DRIVES INCLUDING FLEXIBLE INTERCONNECTING DRIVE ELEMENTS

The present invention relates generally to improvements in planetary differential drives and more particularly to such drives in which each pair or couple consisting of a driving and a driven toothed element is interconnected by a flexible chain or belt.

Conventional differential planetary drives are useful in a broad range of mechanical applications. Such drives would be applicable to a much greater number of situations if their cost of production were more moderate. A major factor contributing to the high cost is the need that the planet and sun gears be of special pitch and tooth form with the result that special cutters and handling are required in manufacturing and there is also a need to maintain separate inventories of highly specialized parts.

In addition, conventional planetary differential drives whether comprising spur gears or straight or curved tooth bevel gears generally require continuous lubrication in order to avoid rapid wear. Such drives are therefore frequently enclosed within sealed housings to maintain the requisite lubrication and cleanliness conditions and these sealed housings result in substantially increased costs both in manufacturing and in maintenance.

In addition, in the conventional type of planetary differential drive including a plurality of planet pinions, extreme accuracy is required in mounting the pinions in order to avoid concentrating the total load in a single pinion, a condition which even when the drive is provided with adequate lubrication, sharply increases wear as a result of the stress. The plurality of planet pinions bearing upon a single central sun gear also tends to increase wear of the sun gear at a greater rate than is encountered in the individual planet pinions.

It is accordingly a general object of the present invention to reduce the cost of manufacturing and maintaining planetary differential drives.

A further object is to provide greater flexibility in the attainment of a broad range of drive ratios without incurring the large expense of components produced especially for the limited requirements of specialized planetary drive applications.

Still another object is to provide a drive suitable for service under adverse environmental conditions of lubrication and in the presence of usually objectionable foreign matter.

Yet another object is to provide forms of planetary differential drives in which component parts may be replaced readily in the field and at very moderate cost by mechanics of average skill.

The foregoing objects are achieved according to the present invention by a variety of differential planetary drive formats in each of which related pairs of driving and driven toothed elements or couples are interconnected by a complementary flexible chain or belt.

In most embodiments, both driving and driven elements are standard off-the-shelf sprockets interconnected by a roller chain. According to a feature of the invention, not only are the sprockets off-the-shelf items but the construction lends itself to the use of readily available commercial bearing blocks and shafting and even the main and planet shafts may be supported on standard sprockets of larger diameters. Commercial bearing blocks are mounted directly on the large sprockets for rotatably supporting the various shafts.

An important advantage of the present construction is that very large numbers of drive ratios are attainable by the simple expedient of changing one or more commercially available sprockets for other commercially available sprockets and correspondingly adjusting the sprocket center distances and the lengths of interconnecting roller chains to the extent necessary to accommodate the changes in the number of teeth of the sprockets.

The foregoing objects, features and advantages of the present invention together with a multiplicity of potential uses will become apparent from the following detailed description of illustrative embodiments taken in connection with the accompanying drawings in which.

Figure 1:
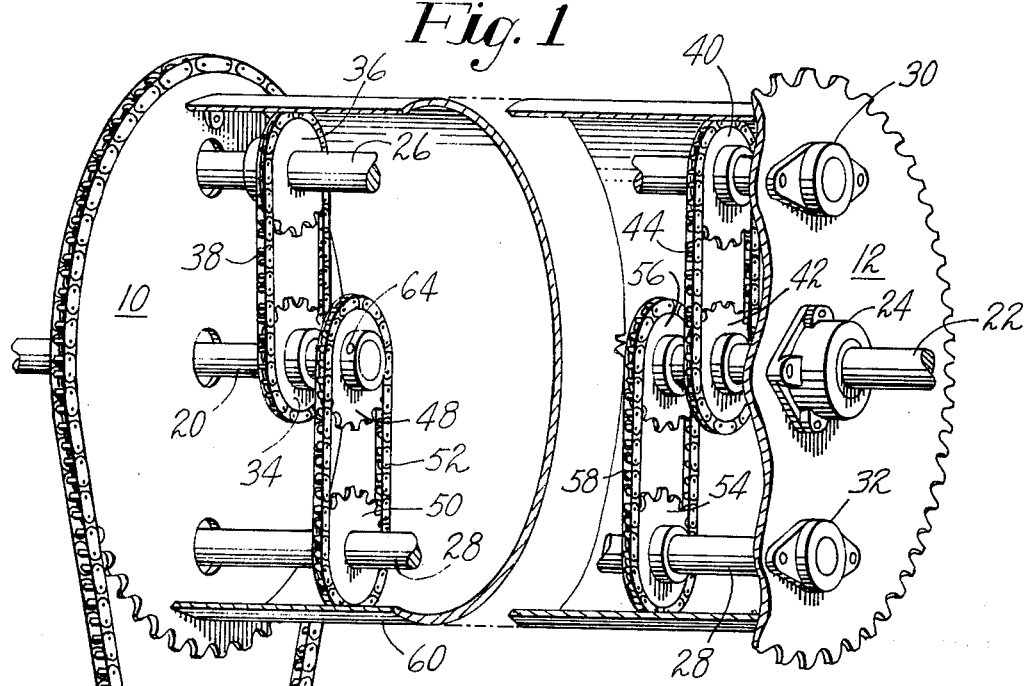
FIG. 1 is a view in perspective of a dual path two stage planetary differential drive in accordance with the present invention and in which driving and driven elements of each stage are interconnected by roller chains.

Turning now to the drawings, particularly FIG. 1, there is shown a two stage balanced planetary differential drive for achieving a very low backlash level especially suited for accurate positioning applications or for other purposes requiring reversals in direction of rotation either at the input or the output. The drive of FIG. 1 includes a pair of mounting sprockets 10 and 12 spaced apart and serving as a combination rotary input, bearing supports for component shafts and a portion of an enclosure for shielding the moving parts of the drive. As depicted in FIG. 1, the sprocket 10 is shown interconnected by a roller chain 14 with a drive sprocket 16 mounted on a shaft 18, which provides a rotary input to the drive. Mounted co-axially with the sprockets 10 and 12 are an input shaft 20 and an output shaft 22, each shaft being journaled in a flanged bearing block, one of which, that for the shaft 22 is shown at 24 mounted on the exterior of the sprocket 12, a similar bearing block (not shown) being provided for the shaft 20 on the rearward exterior side of the sprocket 10. The shafts 20 and 22 may be interconnected by a sleeve bearing to provide added inboard support while permitting relative rotary motion between the shafts. Also journalled for rotation relative to the mounting sprockets 10 and 12 are a first planet shaft 26 and a second planet shaft 28 similarly mounted for rotation in commercially available flanged bearing blocks. Thus, the shaft 26 is mounted in a pair of bearing blocks one of which is shown at 30 while the shaft 28 is rotatable in bearing blocks, one of which is shown at 32. The mounting of each shaft includes an opposite bearing block (not shown) on the rearward exterior surface of the sprocket 10. The drive of FIG. 1 includes two parallel drive paths which may be adjusted and locked in place so as to take up any backlash which would otherwise occur. The first path includes, in the first stage, a driving sprocket 34 keyed to the shaft 20 and a driven sprocket 36 keyed to the shaft 26. The sprockets 34 and 36 are interconnected by a roller chain 38. The second stage of the first path includes a driving sprocket 40 also keyed on the shaft 26 and a driven sprocket 42 keyed to the output shaft 22. The sprockets 40 and 42 are coupled by a roller chain 44. The second path includes, in the first stage, a driving sprocket 48 keyed to the shaft 20 and a driven sprocket 50 fixedly mounted upon the shaft 28, the two sprockets 48 and 50 being interconnected by a roller chain 52. The second stage of the second path includes a driving sprocket 54 secured to the shaft 28 and a driven sprocket 56 keyed to the shaft 22, the sprockets 54 and 56 being interconnected by a roller chain 58. A shield 60 encloses the drive, being secured to the sprockets 10 and 16.

A high ratio of speed reduction and a corresponding torque multiplication are obtainable through the use of mechanisms such as that already described will be understood from the following examples in which variations in the number of teeth for the various sprockets are introduced in applicable formulas for calculating input to output ratios. Assuming the shaft 20 to be the input shaft and the shaft 22 the output shaft, the mounting sprockets 10 and 12 remaining stationary, the turns ratio of input to output is given by the formula:

$$\text{ratio}\frac{F}{G} = \frac{A \times C}{B \times D}.$$

If the input shaft 20 remains stationary and the input is through the sprocket 10, the turns ratio of the sprocket 10 to the output shaft 22 is given be the formula:

$$\text{ratio}\frac{H}{G} = 1 - \frac{A \times C}{B \times D}.$$

Values to be inserted in the formulas are derived from the following:

| Symbol | Function | Drawing No. |
|--------|----------|-------------|
| A | 1st Driving sprocket | 34 |
| B | 1st Driven sprocket | 36 |
| C | 2nd Driving sprocket | 40 |
| D | 2nd Driven sprocket | 42 |
| F | Input shaft | 20 |
| G | Output shaft | 22 |
| H | Sprocket | 10 |

EXAMPLE 1

If: A=16 B=17 C=18 D=17

$$\text{Ratio}\frac{F}{G} = \frac{16 \times 18}{17 \times 17} = \frac{288}{289}$$

$$\text{Ratio}\frac{H}{G} = 1 - \frac{16 \times 18}{17 \times 17} = \frac{1}{289}$$

EXAMPLE 2

If: A=16 B=18 C=19 D=17

$$\text{Ratio}\frac{F}{G} = \frac{16 \times 19}{18 \times 17} = \frac{152}{153}$$

$$\text{Ratio}\frac{H}{G} = 1 - \frac{16 \times 19}{18 \times 17} = \frac{1}{153}$$

EXAMPLE 3

If: A=16 B=18 C=17 D=19

$$\text{Ratio}\frac{F}{G} = \frac{16 \times 17}{18 \times 19} = \frac{136}{171}$$

$$\text{Ratio}\frac{H}{G} = 1 - \frac{16 \times 17}{18 \times 19} = \frac{35}{171}$$

It is seen from the foregoing examples that two stage, double path compound drives according to the present invention may be employed for wide variations of turns ratios of input to output shafts. For all practical purposes in many applications the degree of reduction is so slight in examples 1 and 2 above when the input is through the shaft 20 to the output through the shaft 22 that such through drive may be considered as providing no reduction.

However, an input through the sprocket 10 may provide an extremely accurate variation in the location of the output shaft. Thus, in Example 1, a full revolution of the sprocket 10 changes the position of the output shaft approximately one degree. In the second example, the effect of a single revolution of the sprocket 10 is approximately doubled in that it changes the position two degrees in the position of the shaft 22. The potential for introducing corrections in the relative positions of two shafts is valuable in various printing applications to obtain corrections in the registration of successive impression cylinders.

The correction factor is all the more valuable when it is realized that it may be introduced in either direction without appreciable backlash. As has already been suggested, the form of drive depicted in FIG. 1 includes dual paths which may be set in opposition in order to eliminate a substantial part of what would be considered normal backlash. On the other hand, the two paths may be adjusted in conjunction in order to share the load if the particular application does not require the substantial elimination of backlash. In order to set the two paths in opposition, the entire drive is assembled, each of the sprockets being fixedly located with respect to the shaft on which it is mounted with the exception of the sprocket 48 which is mounted on the shaft 20 but temporarily kept free to rotate on the shaft. With the shafts 20, 22, 26 and 28 accurately located and with the sprockets 34, 36, 40, 42, 50, 54 and 56 fixedly secured to their respective shafts as by keys and the chains 38, 44, 52 and 58 in place, the shaft 22 is first locked and the shaft 20 pre-loaded in a clock-wise direction as seen from its inner end. When the shaft 20 has been turned as far as it will go in a clockwise direction, it is also then locked in place against rotation. The sprocket 48 is then turned in a counter-clock-wise direction and when it has travelled as far as possible to take up whatever backlash there may be in the system, it is temporarily locked in place upon the shaft 20 and its hub and the shaft 20 is drilled and reamed for a taper pin 64. If, on the other hand it is desired to have the two paths share the load, the same procedure is followed except that the sprocket 48 is turned in a clock-wise direction before being permanently secured to the shaft 20 by the taper pin 64. Alternatively instead of the pin 64, all sprockets may be keyed initially and an idler sprocket introduced in one of the paths to take up the backlash or slack.

Figure 2:
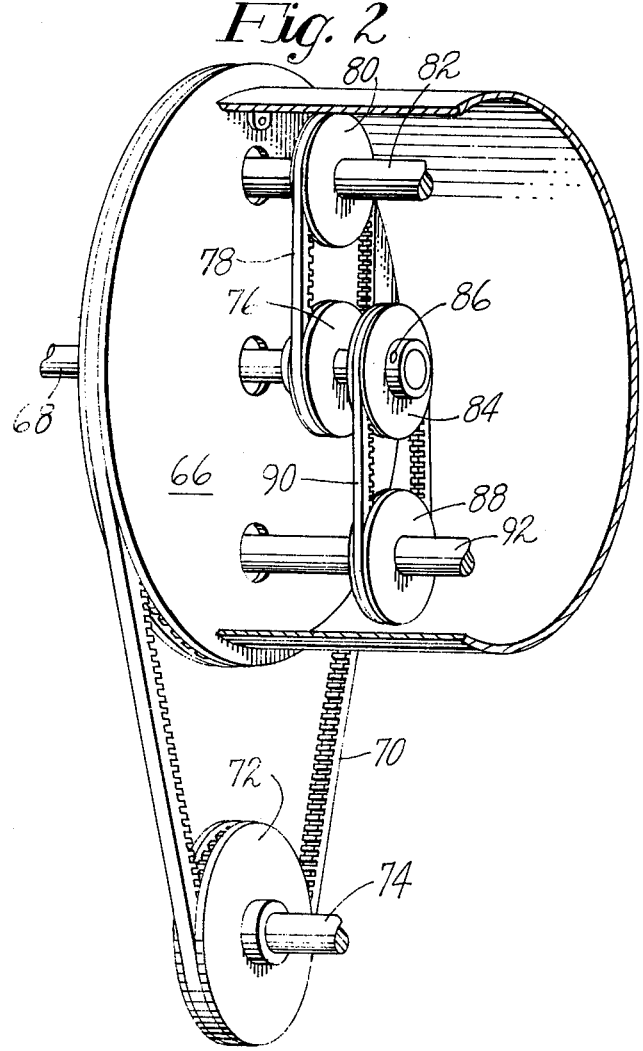
FIG. 2 is a fragmentary view in perspective of a drive similar to that of FIG. 1 but in which each pair consisting of a driving and a driven element is interconnected by a cogged belt.

There is shown in FIG. 2 a fragmentary drawing of an alternative construction of the present drive which is useful in applications in which for one reason or another roller chains and sprockets may be objectionable. Such an application may be one in which the noise level of roller chains however slight may not be tolerable or one in which the presence of lubrication is highly objectionable. The construction of the device of FIG. 2 is basically the exact counterpart of that of FIG. 1 except that it has been adapted to cogged belts and pulleys to replace the chains and sprockets. Thus, there is shown in FIG. 2 a portion of a drive comprising a large mounting pulley 66 corresponding to the sprocket 10. The pulley 66 is rotatably supported on an input shaft 68 by means of a bearing block (not shown) such as has been explained with reference to the mounting of the sprocket 10 on the shaft 20. The pulley 66 is coupled by means of a cogged belt 70 to a smaller drive sprocket 72 fixedly supported on a shaft 74 corresponding exactly in function to the shaft 18 of the device illustrated in FIG. 1. A pulley 76 keyed to the shaft 68 is connected by a cogged belt 78 to a driven pulley 82 fixedly secured to a first planetary shaft 82. A second driving pulley 84 is also fixedly mounted upon the shaft 68 in the manner of the sprocket 48 upon the shaft 20. The pulley 84 which is fixed in place on the shaft 68 by a pin 86 is coupled to a driven pulley 88 by a cogged belt 90. The pulley 88 is fixedly secured such as by a key to a second planetary shaft 92. If the mechanism fragmentarily shown in FIG. 2 is completed to include elements corresponding to those of FIG. 1, the operating results obtainable are essentially comparable although some potential limitations may be encountered in obtaining the advantages of cogged belts over roller chains. Among these is the tendency to a somewhat larger package size for the transmittal of comparable torques and speeds. Another is the tendency to encounter limitations at higher torques and the tendency to have more limited choice of center distances because of the fact that standard cogged belts are available only in substantial length increments and are not directly comparable to roller chains which are simply changed in their lengths by adding or removing a link at a time.

Figure 3:
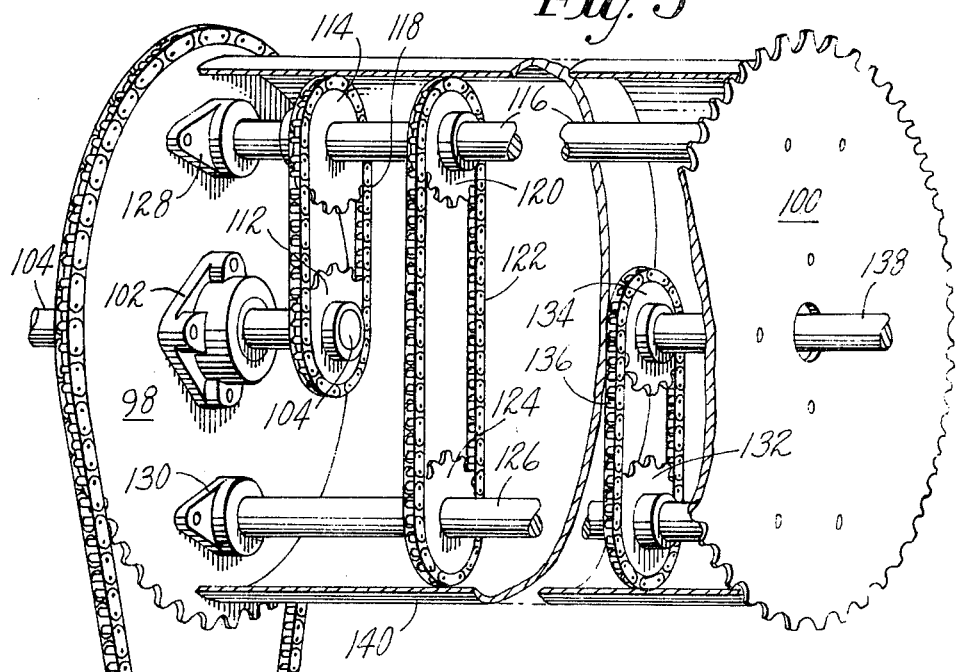
FIG. 3 is a view in perspective of a three stage planetary differential drive in which the driving and driven elements of each stage are interconnected by a roller chain.

There is shown in FIG. 3 a compound drive including a single three stage power path offering substantially higher reduction ratios than are obtainable with the drives illustrated in FIGS. 1 and 2 and already described. The drive of FIG. 3 comprises a pair of spaced-apart mounting sprockets 98 and 100 which perform essentially the same functions as the sprockets 10 and 12 of the mechanism illustrated in FIG. 1. The sprocket 98 is rotatably mounted by means of a flanged bearing block 102 upon an input shaft 104 and is connected by means of a roller chain 106 to a driving sprocket 108 mounted upon a shaft 110. A first couple in the power path comprises a driving sprocket 112 keyed to the shaft 104 and a driven sprocket 114 keyed upon a first planetary shaft 116 and coupled to the sprocket 112 by a roller chain 118. Also keyed to the shaft 116 is a driving sprocket 120 which is connected by a roller chain 122 to a driven sprocket 124 keyed to a second planetary shaft 126. The shafts 116 and 126 are rotatably mounted on the sprockets 98 and 100 in commercially available opposed bearing blocks one of which is shown respectively at 128 and 130, like blocks being provided at the opposite ends of the shafts on the inner surface of the mounting sprocket 100. The third couple comprises a driving sprocket 132 connected to a driven sprocket 134 by means of a roller chain 136. The sprocket 134 is keyed to an output shaft 138 which is rotatably supported with respect to the sprocket 100 by means of a bearing block like that indicated at 102 on the sprocket 98. As was indicated with respect to the input and output shafts of the drive of FIG. 1, the shafts 104 and 138 may be additionally supported by a bearing sleeve into which the shafts are free to rotate. Surrounding the mechanism is a shield 140 secured to the sprockets 98 and 100.

As has already been indicated, a mechanism such as that already described with reference to FIG. 3 is adapted to very large reduction from the sprocket 98 to the output shaft 138. Thus, a reduction of 4914 to 1 is obtainable by designing the drive with the following members of teeth in the various sprockets: 112, 120 and 132, 17 teeth; 114, 13 teeth; 124, 21 teeth; and 134, 18 teeth. Under these conditions, the turns ratios to the shafts 104 to 138 is 4913 to 4914, essentially unity.

Figure 4:
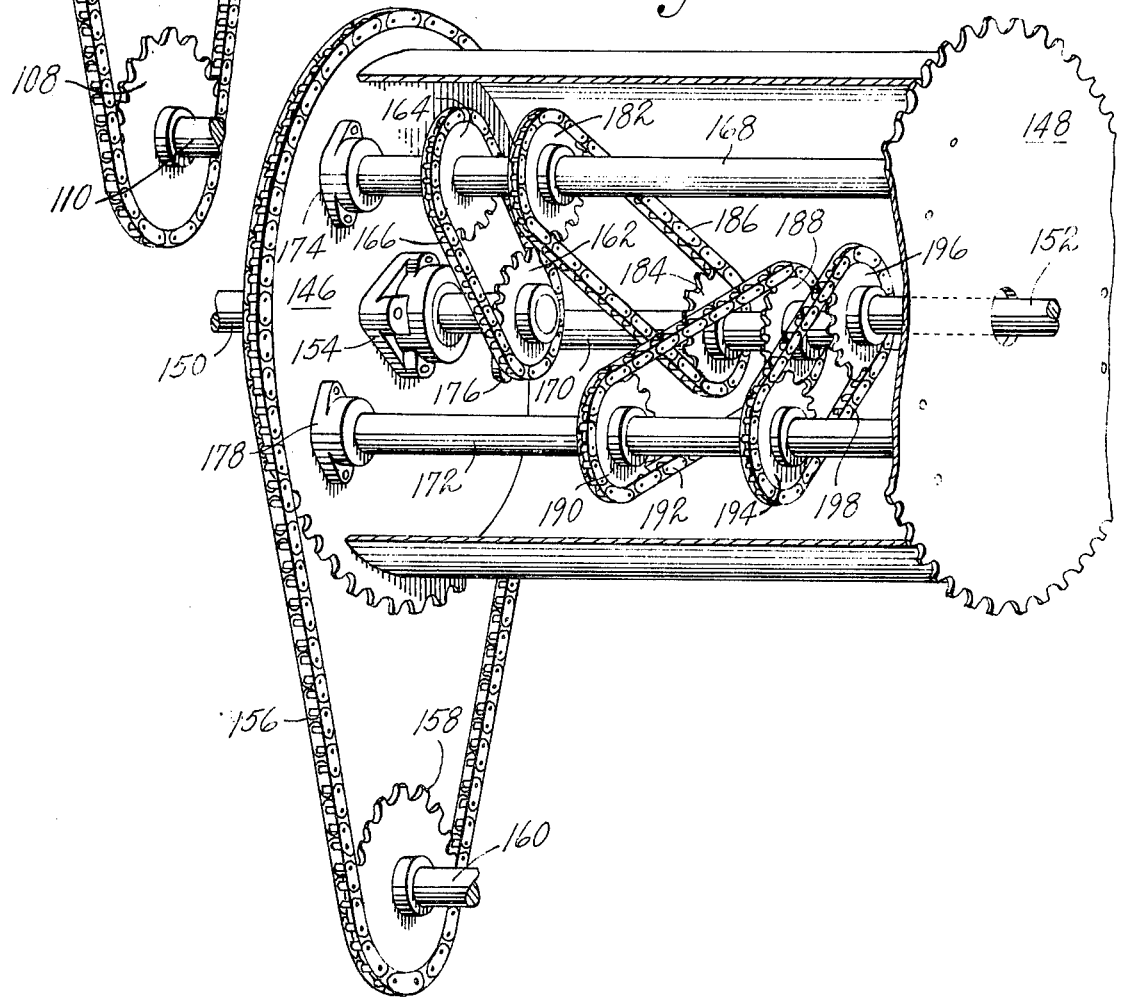
FIG. 4 is a view similar to FIG. 3 but of a four stage planetary differential drive in which driving and driven elements are also interconnected by roller chains.

Shown in FIG. 4 is a compound planetary drive according to the present invention but comprising a single four stage path. The drive of FIG. 4 includes a pair of mounting sprockets 146 and 148 and input and output shafts 150 and 152 respectively. The shafts 150 and 152 are rotatably mounted with respect to the sprockets 146 and 148 respectively by means of bearing blocks one of which is shown at 154 for the shaft 150. As has already been indicated for prior embodiments, the shafts 150 and 152 may be provided with additional inboard support by extending the shafts inwardly into a bearing sleeve in which both shafts are rotatable. The sprocket 146 is coupled by a roller chain 156 to a driving sprocket 158 secured to a shaft 160. The drive of FIG. 4 comprises a first stage or couple including a driving sprocket 162 interconnected with a driven sprocket 164 by means of a roller chain 166. The sprocket 162 is keyed to the shaft 150 and the sprocket 164 is similarly keyed to a first planetary shaft 168 which, with two other planetary shafts 170 and 172 are equally spaced about the axis of the input and output shafts 150 and 152. The shafts 168, 170 and 172 are each rotatable in bearing blocks at each end secured to the inner surfaces of the mounting sprockets 146 and 148, the shafts being journalled respectively in bearing blocks on the inner surface of the sprocket 146 designated as 174, 176 and 178.

A second stage or couple in the drive of FIG. 4 comprises a driving sprocket 182 keyed to the shaft 168 and coupled to a driven sprocket 184 keyed to the shaft 170. The sprockets 182 and 184 are interconnected by a roller chain 186. A third couple consists of a driving sprocket 188 keyed to the shaft 170 and connected to a driven sprocket 190 keyed to the shaft 172, the sprocket 188 being coupled to the sprocket 190 by a roller chain 192. A final stage consists of a driving sprocket 194 keyed to the shaft 172 and coupled to a sprocket 196 by a roller chain 198. The sprocket 196 is keyed to the output shaft 152.

By the use of a four stage drive such as that already described with reference to FIG. 4, very high reduction ratios are attainable. Thus, a possible combination may be an arrangement in which the various sprockets have numbers of teeth as follows:

| Driving | | Driven | |
| --- | --- | --- | --- |
| Item No. | No. of teeth | Item No. | No. of teeth |
| 162 | 19 | 164 | 14 |
| 182 | 17 | 184 | 23 |
| 188 | 19 | 190 | 18 |
| 194 | 17 | 196 | 18 |

Under these conditions, the output shaft 152 will make 104,328 revolutions to 104,329 of the input shaft 150, for all practical purposes unity. However, the output shaft will make 1 revolution to each 104,329 revolutions of the mounting sprocket 146. Such a high ratio is of value for introducing very accurate minute corrections in the relative angular positions of successive rotating elements which must be matched in many applications.

Figure 5:
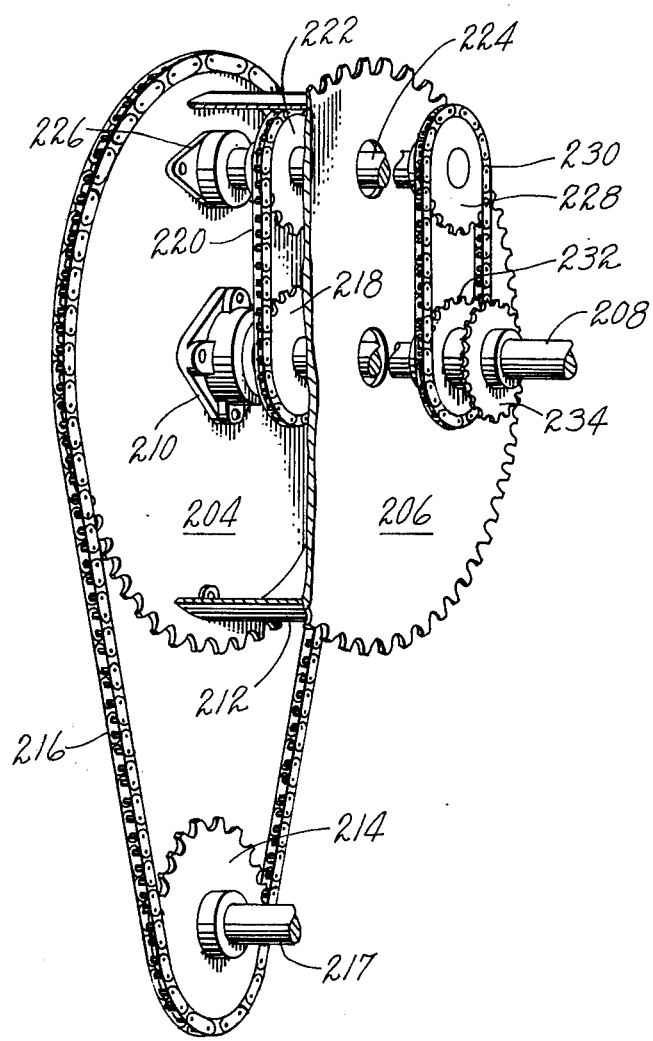
FIG. 5 is a view in perspective of a compact two stage planetary differential drive including a particularly advantageous mounting of planet and output sprockets.

The drive assembly depicted in FIG. 5 is of particular advantage because of its compactness and also because it is mounted on a single uninterrupted shaft for added ruggedness and simplicity. The drive of FIG. 5 comprises a pair of mounting sprockets 204 and 206 journaled on a single shaft 208 by means of a pair of bearing blocks one of which is shown at 210. The mounting sprockets 204 and 206 are interconnected by a shield 212 and the sprocket 204 is coupled to a driving sprocket 214 by a roller chain 216. The sprocket 214 is fixed to a shaft 217 which is a source of angular corrective movement. The mechanism of FIG. 5 includes a first driving sprocket 218 keyed to the shaft 208 and coupled by means of a roller chain 220 to a driven sprocket 222 keyed to a planetary shaft 224 which is journalled in a bearing block 226 on the inner surface of the mounting sprocket 204 and a similar one on the inner surface of the sprocket 206. Also keyed to the shaft 224 is a driving sprocket 228 which is connected by a roller chain 230 to a driven sprocket 232 which is coupled to turn with an output sprocket 234, both the sprockets 232 and 234 being free to rotate on the shaft 208.

The various drives have been described as including roller chains and/or cogged belts as the flexible interconnecting elements. It will be realized, however, that under certain conditions, inverted chains or so-called "silent chains" may offer advantages with appropriate substitutions in the sprockets. It is accordingly not intended that the scope of the invention be limited by the specific elements herein depicted but that the scope be interpreted in terms of the appended claims.

Having thus disclosed my invention, what I claim as new and desire to secure by Letters Patent of the United States is:

1. A differential planetary drive assembly comprising means defining a primary axis, means defining a secondary axis, a rotatable external planetary carrier journalled about the primary axis for supporting the secondary axis for movement about the primary axis, a power path comprising a first couple including a driving toothed wheel on the primary axis, a driven toothed wheel on the secondary axis and a complementary flexible connector linking the driving and driven wheels and a second couple including a second driving toothed wheel on the secondary axis, a second driven toothed wheel on the primary axis and a complementary flexible connector linking the second driving and driven wheels.

2. A drive assembly according to claim 1 further characterized in that the carrier is in the form of a relatively large toothed wheel connectable to a rotary input through a flexible connector.

3. A drive assembly according to claim 1 further characterized in that the flexible connectors are roller chains.

4. A drive assembly according to claim 1 further comprising a second power path cooperatively associated with the first power path and comprising means defining a tertiary axis supported on the carrier for movement about the primary axis, a first couple including a driving toothed wheel on the primary axis, a toothed driven wheel on the tertiary axis and a second couple including a second driving toothed wheel on the tertiary axis, a second driven wheel on the primary axis and a flexible connector linking the second driving and driven wheels.

5. A drive assembly according to claim 1 further characterized in that the flexible connectors are cogged belts.

6. A drive assembly according to claim 1 further characterized in that the carrier comprises a pair of relatively large toothed wheels spaced apart along the primary axis and the assembly further comprises a shell surrounding the primary and secondary axes and extending between and secured to the large toothed wheels.

7. A drive assembly according to claim 1 further characterized in that the means defining the primary axis comprises coaxial input and output shafts and that the first driving wheel is mounted on the input shaft and the second driven wheel is mounted on the output shaft.

8. A drive assembly accoridng to claim 1 further characterized in that the means defining the primary axis is a single main shaft and that the second driven wheel is free to rotate on the main shaft.

9. A drive assembly according to claim 8 further comprising an output wheel coupled to the second driven wheel and also free to rotate on the main shaft.

10. A differential planetary drive assembly comprising means defining a primary axis, means defining a secondary axis, means defining a tertiary axis, a rotatable external planetary carrier journalled about the primary axis for supporting the secondary and tertiary axes for movement about the primary axis, a first couple including a driving toothed wheel on the primary axis, a driven toothed wheel on the secondary axis and a complementary flexible connector linking the driving and driven wheels, a second couple including a second driving toothed wheel on the secondary axis, a second driven toothed wheel on the tertiary axis and a complementary flexible connector linking the second driving and driven wheels and a third couple including a third driving toothed wheel on the tertiary axis, a third driven toothed wheel on the primary axis and a complementary flexible connector linking the third driving and driven wheels.

* * * * *